United States Patent
Whisnant et al.

(10) Patent No.: US 7,523,014 B2
(45) Date of Patent: Apr. 21, 2009

(54) HIGH-SENSITIVITY DETECTION OF AN ANOMALY IN A QUANTIZED SIGNAL

(75) Inventors: Keith A. Whisnant, La Jolla, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 283 days.

(21) Appl. No.: 11/348,655

(22) Filed: Feb. 6, 2006

(65) Prior Publication Data

US 2007/0183305 A1 Aug. 9, 2007

(51) Int. Cl.
*G06F 17/18* (2006.01)

(52) U.S. Cl. .................................... 702/179

(58) Field of Classification Search ............... 702/57, 702/58, 69, 85, 111, 179, 181–183, 193, 702/11, 189
See application file for complete search history.

(56) References Cited

U.S. PATENT DOCUMENTS 7,280,988 B2 * 10/2007 Helsper et al. ............... 706/26

2003/0055607 A1 * 3/2003 Wegerich et al. ............ 702/188

* cited by examiner

*Primary Examiner*—Edward Raymond
*Assistant Examiner*—Mohamed Charioui
(74) *Attorney, Agent, or Firm*—Park, Vaughan & Fleming LLP

(57) ABSTRACT

One embodiment of the present invention provides a system that facilitates detecting an anomaly in a signal, wherein the signal is sampled to produce a set of possible quantized signal values. During operation, the system constructs a "reference distribution" for an "occurrence frequency" of a specific quantized signal value from the set of possible quantized signal values. The system then obtains a "deviant distribution" associated with the reference distribution, wherein the deviant distribution has an offset from the reference distribution to indicate an anomaly in the signal. Next, in response to a new occurrence of the specific quantized signal value, the system updates a mean and a variance of the reference distribution for the specific quantized signal value. The system also adjusts the deviant distribution for the specific quantized signal value based on the updated mean and the updated variance of the reference distribution for the specific quantized signal value.

22 Claims, 4 Drawing Sheets

HIGH-SENSITIVITY DETECTION OF AN ANOMALY IN A QUANTIZED SIGNAL

BACKGROUND

1. Field of the Invention

The present invention relates to techniques for automatically detecting problems in systems. More specifically, the present invention relates to a method and an apparatus that facilitates automatic high-sensitivity detection of anomalies in a signal.

2. Related Art

Modern server computer systems are typically equipped with a significant number of sensors which monitor signals during the operation of the computer systems. Results from this monitoring process can be used to generate time series data for these signals which can subsequently be analyzed to determine how a computer system is operating. One particularly desirable application of this time series data is for purposes of "proactive fault monitoring" to identify leading indicators of component or system failures before the failures actually occur.

Unfortunately, many of these computer systems use low-resolution eight-bit analog-to-digital (A/D) converters in their physical sensors to sample the signals. This causes readings of physical variables such as voltage, current, and temperature to be highly quantized. Hence, the sampled signal values from these sensors can only assume discrete values, and no readings can be reported between these discrete values. For example, voltages for system board components may be quantized to the nearest 10 mV; e.g. 1.60 V, 1.61 V, 1.62 V, etc. Hence, if the true voltage value is 1.6035 V, it can only be reported as one of the quantized values, 1.60 or 1.61.

Note that the above-described quantization effect presents a serious problem for proactive fault monitoring. Normally, one can apply statistical pattern recognition techniques to continuous signal values to detect if the signals start to drift away from steady-state values at a very early stage of system degradation. However, with significant quantization, conventional statistical pattern recognition techniques cannot be used effectively to detect the onset of subtle anomalies that might precede component or system failures.

To overcome this quantization problem, researchers have used a moving histogram technique to represent each quantized physical signal and also use multi-hypothesis Sequential Probability Ratio Tests (SPRTs) to detect subtle changes in the signal. The moving histogram technique when combined with the SPRT technique has demonstrated promising sensitivity and robustness, even when the variations in the physical variables are a small percentage of the quantization resolution.

Unfortunately, the conventional moving histogram techniques suffer from a serious drawback over time. Specifically, when a system is monitored for a long period of time and exhibits no signal degradation, the conventional moving histogram technique builds up "inertia" in the collected data which makes it less sensitive in detecting the onset of subtle degradation. In other words, the sensitivity, as well as the robustness of the fault detection, decreases as the monitoring time increases.

What is needed is a method and an apparatus for facilitating high-sensitivity detection of anomalies in a signal without the above-described problems.

SUMMARY

One embodiment of the present invention provides a system that facilitates high-sensitivity detection of an anomaly in a signal, wherein the signal is sampled to produce a set of possible quantized signal values. During operation, the system constructs a "reference distribution" for an "occurrence frequency" of a specific quantized signal value from the set of possible quantized signal values. The system then obtains a "deviant distribution" associated with the reference distribution, wherein the deviant distribution has an offset from the reference distribution to indicate an anomaly in the signal. Next, in response to a new occurrence of the specific quantized signal value, the system updates a mean and a variance of the reference distribution for the specific quantized signal value. The system also adjusts the deviant distribution for the specific quantized signal value based on the updated mean and the updated variance of the reference distribution for the specific quantized signal value. Adjusting the deviant distribution in this way reduces the offset between the reference distribution and the deviant distribution, thereby increasing system sensitivity while subsequently detecting anomalies in the signal.

In a variation on this embodiment, the system updates the mean of the reference distribution by computing a ratio of the number of occurrences of the specific quantized signal value to the total number of occurrences of all quantized signal values.

In a variation on this embodiment, the variance of the reference distribution of the specific quantized signal value decreases with the new occurrence of the specific quantized signal value.

In a variation on this embodiment, the system adjusts the deviant distribution for the specific quantized signal value by recomputing both a mean and a variance of the deviant distribution.

In a further variation on this embodiment, the system recomputes the mean of the deviant distribution by adding a fraction of the updated variance of the reference distribution to the updated mean of the reference distribution.

In a variation on this embodiment, the variance of the deviant distribution is in proportion to the variance of the reference distribution.

In a variation on this embodiment, the updated reference distribution and the adjusted deviant distribution are subsequently used in a Sequential Probability Ratio Test (SPRT) to detect an anomaly in the signal by comparing the reference distribution against the deviant distribution.

In a variation on this embodiment, the signal can be a physical parameter or a logical software parameter.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Quantization Effect

Figure 1:
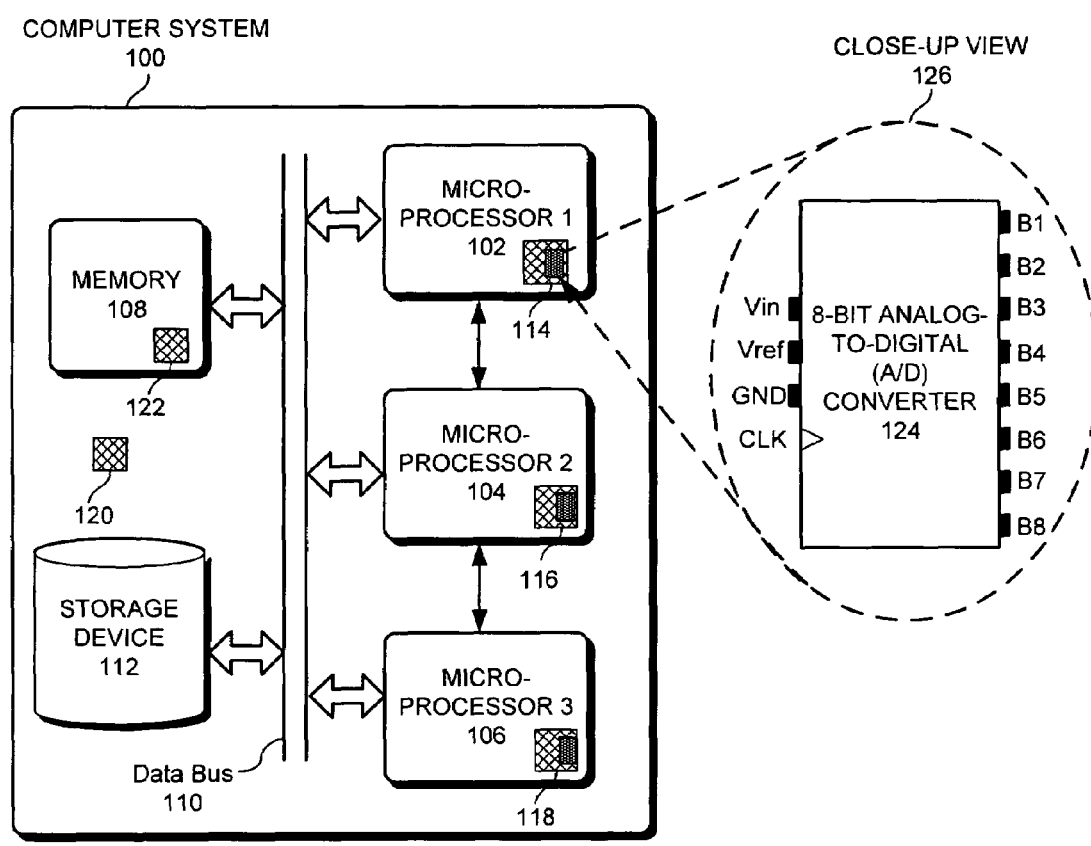
FIG. 1 illustrates a computer system with sensors that monitor signals in different parts of the computer system in accordance with an embodiment of the present invention.

FIG. 1 illustrates a computer system 100 with sensors that monitor signals in different parts of the computer system in accordance with an embodiment of the present invention.

Computer system 100 comprises multiple processors 102, 104, and 106. Processors 102, 104, and 106 communicate with memory 108 through data bus 110. Memory 108 can include any type of memory that can store code and data for execution by the processors 102, 104, and 106. This includes, but is not limited to, static random access memory (SRAM), dynamic RAM (DRAM), magnetic RAM (MRAM), non-volatile RAM (NVRAM), flash memory, and read only memory (ROM).

Processors 102, 104, and 106 communicate with storage device 112 through data bus 110. Storage device 112 can include any type of non-volatile storage device that can be coupled to a computer system. This includes, but is not limited to, magnetic, optical, and magneto-optical storage devices, as well as storage devices based on flash memory and/or battery-backed up memory.

Processors 102, 104, and 106 can include any type of processor, including, but not limited to, a microprocessor, a mainframe computer, a digital signal processor, a personal organizer, a device controller and a computational engine within an appliance.

In order to monitor a signal associated with the operation of computing system 100, several sensors 114, 116, 118, 120, and 122 can be selectively positioned throughout the computing system 100. These sensors (114, 116, 118, 120, and 122) monitor physical signals, such as voltage, current, temperature, humidity, and vibration, within specific components in the computer system. For example, sensor 122 can be used to monitor a particular voltage provided to a bank of storage cells (not shown) in memory 108. Additionally, these sensors monitor logical software parameters associated with the operation of the computer system, such as CPU utilization or swap activity.

In one embodiment, physical sensors 114, 116, and 118 which reside within processors 102, 104, and 106, respectively, are used to detect and identify a drift in core voltage "vCore" of the processors. Each sensor 114, 116 and 118 includes an analog-to-digital (A/D) converter 124, which is shown inside close-up view 126. A/D converter 124 converts a continuous analog signal into a series of discrete, digital values. For example, A/D converter 124 converts the analog vCore signal of processor 102 into a digital format which can be monitored and manipulated by processor 102.

Furthermore, A/D converter 124 shown in FIG. 1 is an eight-bit A/D converter, which means that the digital output generated by A/D converter 124 is represented using an eight-bit value. Specifically, it samples the analog signal at pin $V_{in}$ at a rate determined by clock signal CLK, and produces an eight-bit digital output on pins B1 to B8. Note that A/D converter 124 can generate $2^8$, or 256 discrete values. In comparison, an A/D converter with a 4-bit data output can produce $2^4$, or 16 discrete values. Similarly, a 10-bit A/D converter can produce $2^{10}$, or 1024 discrete values.

The process of representing a continuous, analog signal with discrete values is known as "quantization." For example, the eight-bit A/D converter output representing a vCore signal can be rounded to the nearest 10 mV, with quantized values of 1.60V, 1.61V, 1.62V, 1.63V, etc. Hence, an analog voltage of 1.614V can be represented by the eight-bit A/D converter as either 1.61 V or 1.62V. The distance between the adjacent quantized values is referred to as a "quantization resolution", which is 10 mV in this example. The larger this difference is, the lower the quantization resolution. Note that a low quantization resolution can make it difficult to detect subtle changes which are fractions of the quantization resolution before a significant drift has taken place.

Moving Histogram of Quantized Values

To overcome the quantization effects of a low-resolution A/D converter, one can take advantage of the fact that for a computer system in normal operation, a physical signal in the computer system is normally flat over time.

Note that in most cases not all of the 256 output levels of an eight-bit A/D converter are used. Instead, only a small number of quantized values are generated by the A/D converter outputs to represent the relatively stationary signal value (e.g., A/D output values for vCore can be 1.63 V, 1.64 V, or 1.65 V). A statistical distribution in the form of a moving histogram can be constructed so that for each new sample received, the occurrences of each quantized value are updated, and the occurrence frequency of each quantized value over the total number of samples received are recalculated.

In one embodiment of the present invention, the histogram includes a set of (bin, freq) pairs, wherein "bin" is a specific quantized value (e.g., 1.65 V), and "freq" is the occurrence frequency of samples observed so far that have the "bin" value. For example, after receiving four samples a histogram may be: (1.64 V, 0.50), (1.63 V, 0.25), (1.65 V, 0.25), wherein two samples have value of 1.64 V and the other two samples have values of 1.63 V, 1.65 V, respectively.

If the physical signal is sampled during normal system operation, the signal's histogram should be stationary over time. Because it typically takes a while for the signal's histogram to stabilize to its stationary value, we refer the initial period of sampling and constructing a moving histogram as a "blackout phase," during which the system does not try to determine if the signal's histogram is changing.

After the blackout phase, during a subsequent "training phase," the mean frequency and variance of the frequency for each "bin" in the moving histogram are calculated and recorded. Specifically, for each newly received quantized signal value, the mean frequency and variance of the frequency for each "bin" in the moving histogram is recomputed. Similarly to the blackout phase, no decision is made as to whether the signal's histogram is changing during the training phase.

After the training phase, a Sequential Probability Ratio Test (SPRT) is applied to each "bin" to detect changes in the "bin" frequency which are caused by changes in the physical signal. In order to operation, the SPRT requires a reference distribution and a deviant distribution. The reference distribution is a stationary statistical distribution which is characterized by the mean and variance of the moving histogram during the normal operation, whereas the deviant distribution is characterized by the mean and variance that the "bin" frequency must take for the "bin" to be considered degraded. There are two possible deviant distributions for each "bin": one to detect upward changes in mean; and one to detect downward changes in mean. SPRT alarms are generated for each "bin" that deviates too far from its trained value.

Typically, the mean value of the deviant distribution is derived as an offset from the mean of the reference distribution. Commonly, this offset is specified as a multiple of the standard deviation, (i.e., the square root of the variance of the reference distribution) so that an appropriate amount of overlap exists between the two distributions. The farther away the deviant distribution is from the reference distribution, the farther the "bin" frequency must drift before a SPRT alarm is generated. A more-detailed description of SPRT appears below.

Conventional Sequential Probability Ratio Test (SPRT)

To determine whether the current statistical distribution is statistically different from the mean reference statistical distribution, in which case the signal of interest would be determined to be drifting, the following SPRT expression may be used:

$$SPRT(i) = SPRT(i-1) + \left[\frac{(x_i - M_0)^2}{2\sigma^2} - \frac{(x_i - M_1)^2}{2\sigma^2}\right],$$

where i represents the sample number of the newly sampled quantized value for a particular quantized value, $x_i$ represents the current frequency of the quantized value (i.e., the frequency of the quantized value calculated immediately after the sampling of this value i), $M_0$ represents the "trained" mean frequency of the reference distribution, $M_1$ represents a mean deviant frequency value considered to be "bad", and $\sigma^2$ represents a "trained" variance of the reference distribution.

The SPRT statistic expressed above provides a quantitative framework that enables one to decide between two hypotheses:
1. Nonfailure hypothesis: The current statistic of the quantized value belongs to the reference distribution learned during the training period. The reference distribution is characterized by the mean $M_0$ and variance $\sigma^2$.
2. Failure hypothesis: The current statistic of the quantized value belongs to a deviant distribution. The deviant distribution is characterized by the mean $M_1$ and variance $\sigma^2$.

The mean of deviant distribution $M_1$ may be chosen so as to have a certain absolute value or percentage offset from $M_0$. For example, if the "trained" mean frequency $M_0$ of a particular quantized value is 0.25, then $M_1$ may be set to $M_0$+0.08, or 0.33. This fixed offset may be derived based on empirical studies, or it may be specified by a user.

In one embodiment of the present invention, two SPRT calculations are performed for every new quantized value received: one to determine whether the signal of interest is "drifting up," and one to determine whether the signal of interest is "drifting down." To determine if the signal is "drifting up," $M_1$ can be set to an absolute value or a percentage above $M_0$, and to determine if the signal is "drifting down," $M_1$ can be set to an absolute value or a percentage below $M_0$. The value to which $M_1$ is set may depend upon how wide a range of variation is considered as being acceptable by the user.

Accordingly, in one embodiment of the present invention, two SPRT statistics are computed for each new quantized value received. To determine whether a computed SPRT value is indicative of the signal of interest "drifting," the value is compared to values A (upper or positive threshold) and B (lower or negative threshold) using the following expression:

$$A = \ln\left(\frac{\beta}{1-\alpha}\right), \text{ and } B = \ln\left(\frac{1-\beta}{\alpha}\right),$$

where $\alpha$ is the desired false alarm probability (the probability of deciding Failure hypothesis when the Nonfailure hypothesis holds) and $\beta$ is the desired missed alarm probability (the probability of deciding the Nonfailure hypothesis when the Failure hypothesis holds). Note that statistical tests typically do not produce results with 100% confidence (i.e., $\alpha$ or $\beta$ equal to zero). It is not surprising that setting $\beta$ to zero (no missed alarms) in the above expression produces a lower bound of negative infinity, which means that the SPRT can never decide with 100% confidence whether the bin frequency conforms to the reference distribution. In one embodiment of the present invention, $\alpha=0.001$ and $\beta=0.005$ are set as effective false/missed alarm probabilities.

The initial SPRT statistic for sample zero is set to zero (SPRT(0)=0). When the SPRT statistic crosses the lower threshold B, then enough observations have been seen to accept the Nonfailure hypothesis (observations come from the reference distribution). Conversely, when the SPRT statistic crosses the upper threshold A, then enough observations have been seen to accept the Failure hypothesis (observations come from the deviant distribution). Finally, when the SPRT statistic is between A and B, then no decision can be made at sample i regarding whether the Nonfailure or Failure hypothesis holds. Monitoring continues with the next sample, after which the updated SPRT statistic is compared to the A and B threshold values.

Adjusting Conventional SPRT Sensitivity

Note that when a system is monitored for a long time and exhibits no degradation, the conventional moving histogram technique builds up "inertia" that makes it less sensitive to detecting the onset of subtle degradation. The greater the inertia, the longer it takes for an associated mean frequency to change when a stationary signal starts a degradation, such as in a form of a drift. Hence, the conventional moving histogram approach is more sensitive during the first hours or days of the signal monitoring, but its sensitivity decreases with time. The longer the system is monitored without any degradation, the lower the sensitivity becomes when the degradation first appears. For example, consider a quantized signal that has been sampled 20000 times, with 10000 samples taking a value X and 10000 samples taking a value Y. At this point, even a significant change in the occurrence frequency of newly observed values (e.g., all subsequent observations being Y only) requires a certain amount time to significantly change the frequency distribution from (X, 50%), (Y 50%).

One embodiment of the present invention overcomes inertia effect by taking advantage of the moving histogram's behavior for a stationary signal, wherein the frequency of each "bin" is expected to stabilize at a steady-state value over a sufficient long period of time of observation.

Figure 2:
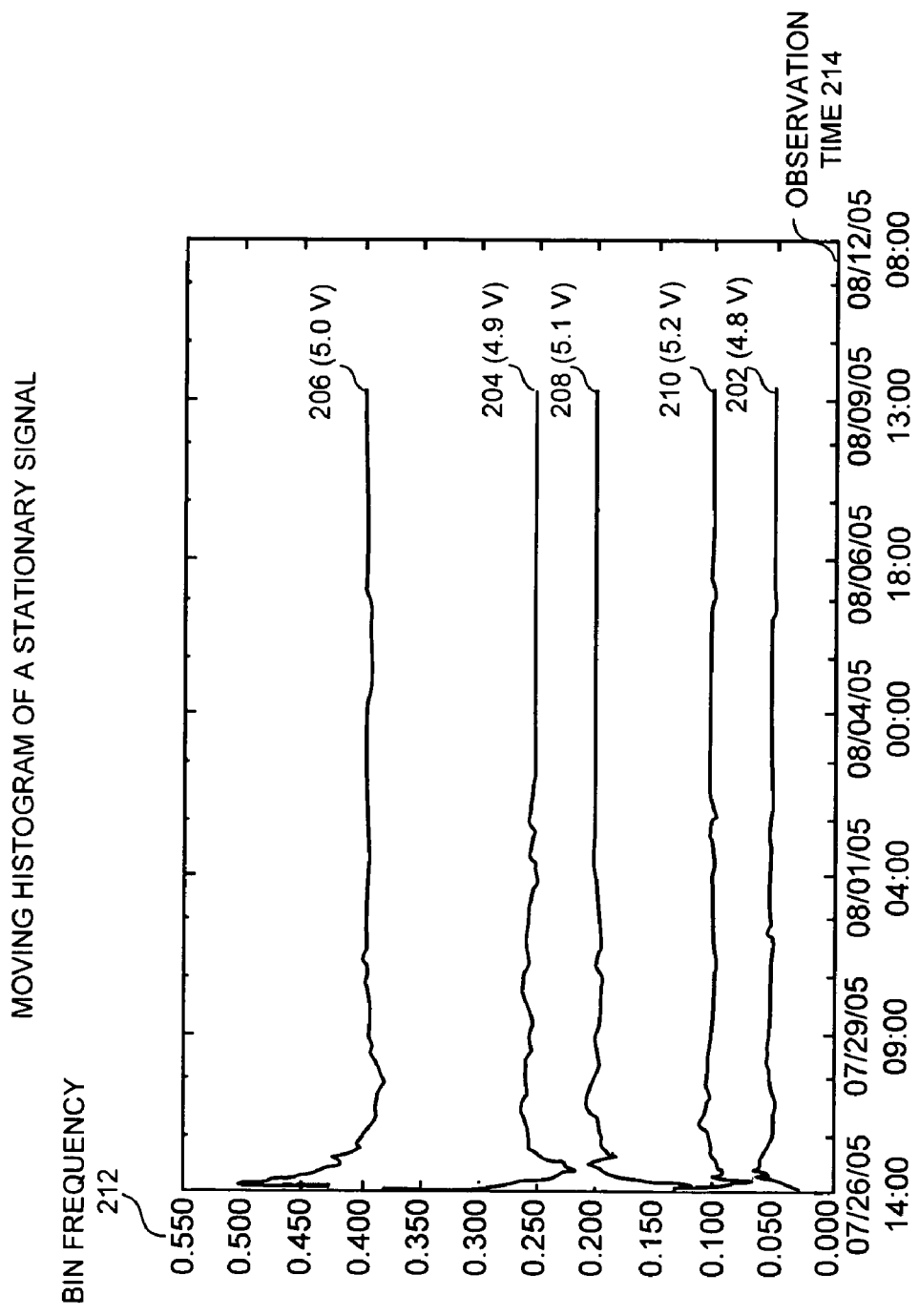
FIG. 2 illustrates an exemplary moving histogram of a stationary signal observed over a long period of time in accordance with an embodiment of the present invention.

FIG. 2 illustrates an exemplary moving histogram of a stationary signal observed over a long period of time in accordance with an embodiment of the present invention. Note that there are five possible quantized voltage values (bins): 4.8 V, 4.9 V, 5.0 V, 5.1 V, and 5.2V, which correspond to moving histograms 202, 204, 206, 208, and 210, respectively. The vertical axis 212 of the plot 200 represents the "bin" frequency, which is in between (0, 1), and the horizontal axis 214 represents the observation time in "hours". FIG. 2 shows that as more samples are recorded in the moving histograms, each "bin" frequency gets closer and closer to its expected steady-state value. For example, 5.0 V (204) in the steady state has a "bin" frequency of about 40% among all observed quantized values. Hence, when considering the sequence of "bin" frequencies as a time series, the variance of this time series decreases as the "bin" frequency value approaches its steady-state value.

From an intuitive standpoint, the decreasing variance of the "bin" frequency time series indicates that the range of expected values for the "bin" frequency decreases over time. Consequently, deviations from steady-states can be detected from smaller absolute changes in the "bin" frequency than would otherwise be required when the "bin" frequency time series has a larger variance.

The above observation can then be incorporated into the conventional SPRT technique by making the mean of the deviant distribution $M_1$ closer to the mean of the reference distribution $M_0$ as more samples are received, which is in contrast to fixing the distance between the deviant and reference distributions at the end of the training phase in the above-described conventional SPRT technique. More specifically, this can be achieved by updating the mean of the deviant distribution with each new observation taken.

In one embodiment of the present invention, the deviant distribution's mean $M_1$ is expressed in terms of the reference distribution's mean $M_0$ and variance $\sigma^2$ as:

$$M_1 = M_0 \pm m \times \sigma \qquad \text{Eqn. 1}$$

where m (m>0) is a user-configurable sensitivity parameter that serves as a multiplier to determine the mean offset (m×σ). Note that as the variance of the reference distribution $\sigma^2$ decreases with time, the deviant distribution gets closer to the reference distribution when the "+" sign is selected in Eqn. 1. Consequently, the SPRT sensitivity is also increased with time.

Process of Adjusting the Deviant Distribution

Figure 3:
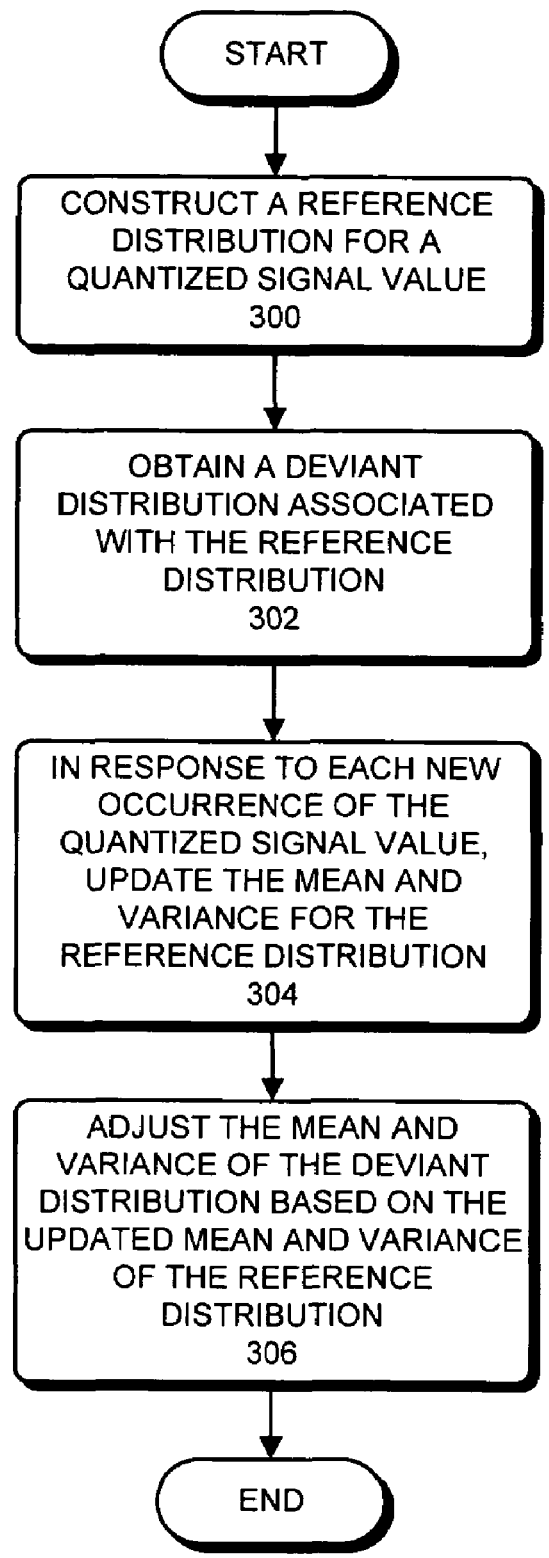
FIG. 3 presents a flowchart illustrating a process that facilitates high-sensitivity detection of an anomaly in a signal in accordance with an embodiment of the present invention.

FIG. 3 presents a flowchart illustrating a process that facilitates high-sensitivity detection of an anomaly in a signal in accordance with an embodiment of the present invention. Note that the signal can include any physical variables in a computer system.

During operation, the system constructs a reference distribution for an occurrence frequency of a specific quantized signal value from the set of possible quantized signal values (step 300). In one embodiment of the present invention, this reference distribution can be derived from the moving histogram. Specifically, for each bin's histogram, a mathematical tool can be used to empirically calculate a mean and a variance of that histogram, and the mean and the variance values can be subsequently used to construct the reference distribution. Note that the mean of the histogram approaches its steady-state value over time.

Next, the system obtains a deviant distribution associated with the reference distribution, wherein the deviant distribution has an offset from the reference distribution to indicate an anomaly in the signal (step 302). For example, Eqn. 1 provides such a computation method for the mean of the deviant distribution based on the reference distribution.

In one embodiment of the present invention, the variance of the deviant distribution is in proportion to the variance of the reference distribution.

Next, in response to a new occurrence of the specific quantized signal value, the system updates both the mean and variance of the reference distribution for the specific quantized signal value (step 304).

Specifically, the system updates the mean of the reference distribution by computing a ratio of the number of occurrences of the specific quantized signal value to the total number of samples received for all possible quantized signal values, i.e., the frequency of occurrences. If "count [b]" represents the number of occurrences of a specific quantized value "b", and "total-count" represents the total number of samples received, the mean of the reference distribution for "b", freq [b] is given by:

$$\text{freq}[b] = \text{count}[b]/\text{total-count}. \qquad \text{Eqn. 2}$$

The system additionally updates the variance of the reference distribution. We have shown in FIG. 2 that the frequency variance of a steady-state signal value decreases with time after the training phase. Statistical estimates for a stationary random process can be used to calculate the variance of the random process as a function of the sample count.

In one embodiment of the present invention, we assume that when k samples are taken, the bin count for bin b (i.e., the number of samples up to sample k that fall within bin b) follows a binomial distribution. Hence, the expected value of this bin count is k×p, where p is the steady-state value of the bin frequency (0<=p<=1), and the expected (mean) value for the associated bin frequency is (k×p)/k=p. Also, based on the binomial distribution, the variance of the bin count at sample k is k×p×(1−p), which makes the variance of the bin frequency at sample k equal to p×(1−p)/k. Thus, the variance of the frequency distribution decreases as the sample count increases.

The system next adjusts the deviant distribution for the specific quantized signal value based on the updated mean and the updated variance of the reference distribution for the specific quantized signal value (step 306). Specifically, the system adjusts the deviant distribution by recomputing the mean and the variance for the deviant distribution.

In one embodiment of the present invention, the system recomputes the mean of the deviant distribution by adding a fraction of the updated variance of the reference distribution to the updated mean of the reference distribution as shown in Eqn. 1. Referring back to Eqn. 1, for $M_1$, note that because both $M_0$ and m are constant, the new mean of the deviant distribution changes as the variance of the reference distribution changes. Hence, as the variance of the reference distribution decreases with increasing sample count, the new mean of the deviant distribution decreases. As a result, adjusting the deviant distribution in this way reduces the offset between the reference distribution for the specific quantized signal value and the deviant distribution, thereby increasing system sensitivity during subsequent detection of anomalies in the signal by comparing the reference distribution for the specific signal value against the deviant distribution in the SPRT technique.

Figure 4:
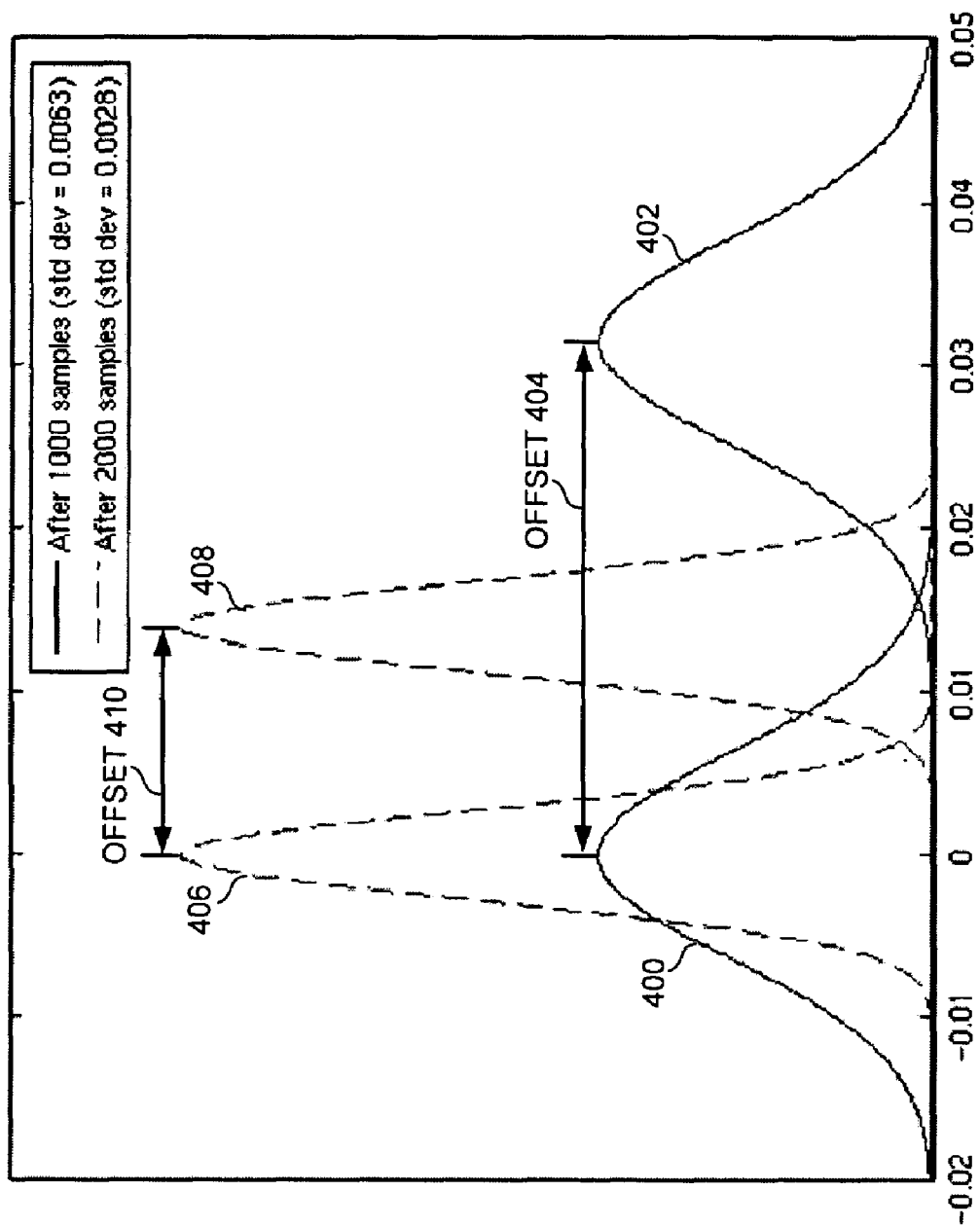
FIG. 4 illustrates how SPRT distributions change with increasing sample count by adjusting the deviant distribution in accordance with an embodiment of the present invention.

FIG. 4 illustrates how SPRT distributions change with increasing sample count by adjusting the deviant distribution in accordance with an embodiment of the present invention.

The solid bell curves 400 and 402 represent the reference distribution (400) and the deviant distribution (402) after 1000 samples have been collected. At this point, an offset 404 between the two curves is roughly 0.32 and the standard deviation for the reference distribution 400 is roughly 0.0063. In comparison, the dotted bell curves 406 and 408 represent the corresponding reference (406) and deviant (408) distributions after 2000 samples have been collected. The standard deviation (therefore the variance) of the reference distribution 406 has decreased from 0.0063 to about 0.0028. Hence, the recomputed mean of the deviant distribution 406, i.e. the new offset 410, is reduced to 0.015 from the original 1000-sample deviant distribution mean around 0.032. Consequently, the new deviant distribution 408 on the right is pulled in closer to the reference distribution 406.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating high-sensitivity detection of an anomaly in a signal, wherein the signal is sampled to produce a set of possible quantized signal values, the method comprising:
   constructing a reference distribution for an occurrence frequency of a specific quantized signal value from the set of possible quantized signal values;
   obtaining a deviant distribution associated with the reference distribution, wherein the deviant distribution has an offset from the reference distribution to indicate an anomaly in the signal;
   in response to a new occurrence of the specific quantized signal value,
      updating mean and variance of the reference distribution for the specific quantized signal value; and
      adjusting a mean ($M_1$) of the deviant distribution for the specific quantized signal value based on the updated mean ($M_0$) and the updated variance ($\sigma^2$) of the reference distribution for the specific quantized signal value according to an expression $M_1 = M_0 \pm f(\sigma^2)$, wherein $f(\sigma^2)$ is a strictly-increasing non-negative function of $\sigma^2$;
   wherein adjusting the deviant distribution in this way reduces the offset between the reference distribution and the deviant distribution, thereby increasing system sensitivity while subsequently detecting an anomaly in the signal.

2. The method of claim 1, wherein adjusting the deviant distribution for the specific quantized signal value involves recomputing both a mean and a variance of the deviant distribution.

3. The method of claim 2, wherein recomputing the mean of the deviant distribution involves adding a fraction of the updated variance of the reference distribution to the updated mean of the reference distribution.

4. The method of claim 1, wherein updating the mean of the reference distribution involves computing a ratio of the number of occurrences of the specific quantized signal value to the total number of occurrences of all quantized signal values.

5. The method of claim 1, wherein the variance of the reference distribution of the specific quantized signal value decreases with the new occurrence of the specific quantized signal value.

6. The method of claim 1, wherein the variance of the deviant distribution is in proportion to the variance of the reference distribution.

7. The method of claim 1, wherein the updated reference distribution and the adjusted deviant distribution are subsequently used in a Sequential Probability Ratio Test (SPRT) to detect an anomaly in the signal by comparing the reference distribution against the deviant distribution.

8. The method of claim 1, wherein the signal can be:
   a physical parameter; or
   a logical software parameter.

9. A computer-readable storage medium storing instructions that when executed by a computer cause the computer to perform a method for facilitating high-sensitivity detection of an anomaly in a signal, wherein the signal is sampled to produce a set of possible quantized signal values, the method comprising:
   constructing a reference distribution for an occurrence frequency of a specific quantized signal value from the set of possible quantized signal values;
   obtaining a deviant distribution associated with the reference distribution, wherein the deviant distribution has an offset from the reference distribution to indicate an anomaly in the signal;
   in response to a new occurrence of the specific quantized signal value,
      updating mean and variance of the reference distribution for the specific quantized signal value; and
      adjusting a mean ($M_1$) of the deviant distribution for the specific quantized signal value based on the updated mean ($M_0$) and the updated variance ($\sigma^2$) of the reference distribution for the specific quantized signal value according to an expression $M_1 = M_0 \pm f(\sigma^2)$, wherein $f(\sigma^2)$ is a strictly-increasing non-negative function of $\sigma^2$;
   wherein adjusting the deviant distribution in this way reduces the offset between the reference distribution and the deviant distribution, thereby increasing system sensitivity while subsequently detecting an anomaly in the signal.

10. The computer-readable storage medium of claim 9, wherein adjusting the deviant distribution for the specific quantized signal value involves recomputing both a mean and a variance of the deviant distribution.

11. The computer-readable storage medium of claim 10, wherein recomputing the mean of the deviant distribution involves adding a fraction of the updated variance of the reference distribution to the updated mean of the reference distribution.

12. The computer-readable storage medium of claim 9, wherein updating the mean of the reference distribution involves computing a ratio of the number of occurrences of the specific quantized signal value to the total number of occurrences of all quantized signal values.

13. The computer-readable storage medium of claim 9, wherein the variance of the reference distribution of the specific quantized signal value decreases with the new occurrence of the specific quantized signal value.

14. The computer-readable storage medium of claim 9, wherein the variance of the deviant distribution is in proportion to the variance of the reference distribution.

15. The computer-readable storage medium of claim 9, wherein the updated reference distribution and the adjusted deviant distribution are subsequently used in a Sequential Probability Ratio Test (SPRT) to detect an anomaly in the signal by comparing the reference distribution against the deviant distribution.

16. The computer-readable storage medium of claim 9, wherein the signal can be:
- a physical parameter; or
- a logical software parameter.

17. An apparatus that facilitates high-sensitivity detection of an anomaly in a signal, wherein the signal is sampled to produce a set of possible quantized signal values, the apparatus comprising:
- a construction mechanism configured to construct a reference distribution for an occurrence frequency of a specific quantized signal value from the set of possible quantized signal values;
- an obtaining mechanism configured to obtain a deviant distribution associated with the reference distribution, wherein the deviant distribution has an offset from the reference distribution to indicate an anomaly in the signal;
- an updating mechanism, wherein in response to a new occurrence of the specific quantized signal value, the updating mechanism is configured to update mean and variance of the reference distribution for the specific quantized signal value; and
- wherein the updating mechanism is configured to adjust a mean ($M_1$) of the deviant distribution for the specific quantized signal value based on the updated mean ($M_0$) and the updated variance ($\sigma^2$) of the reference distribution for the specific quantized signal value according to an expression $M_1 = M_0 \pm f(\sigma^2)$, wherein $f(\sigma^2)$ is a strictly-increasing non-negative function of $\sigma^2$;
- wherein adjusting the deviant distribution reduces the offset between the reference distribution and the deviant distribution, thereby increasing system sensitivity while subsequently detecting an anomaly in the signal.

18. The apparatus of claim 17, wherein adjusting the deviant distribution for the specific quantized signal value involves recomputing both a mean and a variance of the deviant distribution.

19. The apparatus of claim 18, wherein recomputing the mean of the deviant distribution involves adding a fraction of the updated variance of the reference distribution to the updated mean of the reference distribution.

20. The apparatus of claim 17, wherein updating the mean of the reference distribution involves computing a ratio of the number of occurrences of the specific quantized signal value to the total number of occurrences of all quantized signal values.

21. The apparatus of claim 17, wherein the variance of the reference distribution of the specific quantized signal value decreases with the new occurrence of the specific quantized signal value.

22. The apparatus of claim 17, wherein the identifying mechanism is configured to use a Sequential Probability Ratio Test (SPRT) to determine whether the sequence of quantized signal values adheres to a reference distribution or not.

* * * * *